Patented Nov. 4, 1941

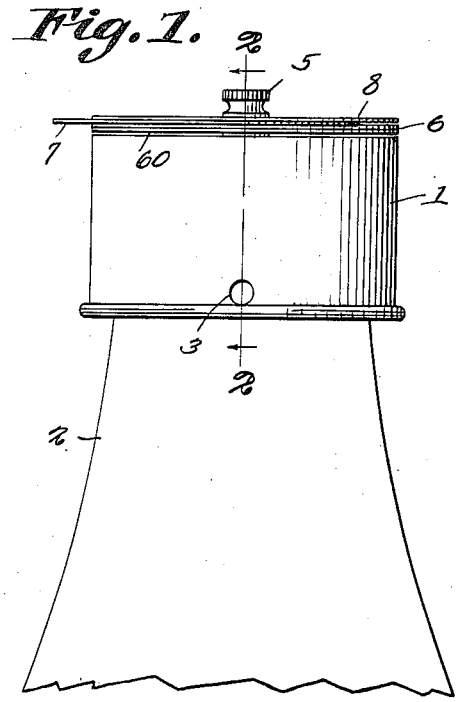
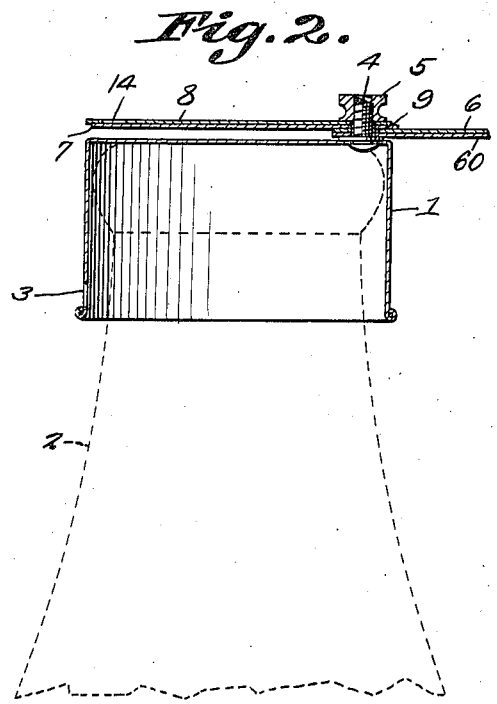
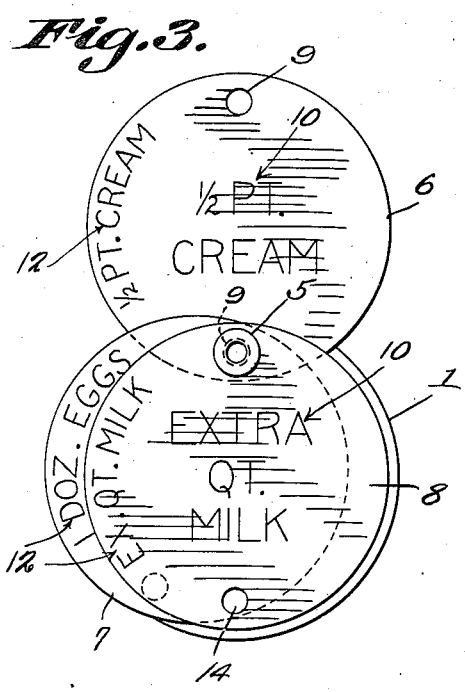
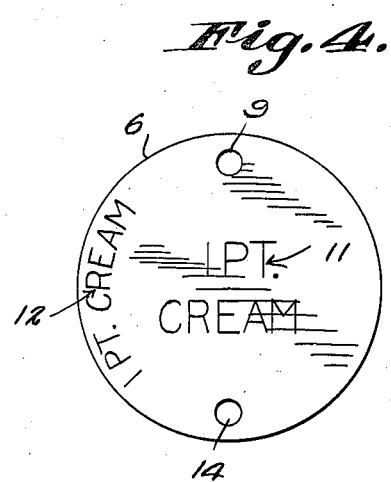
W. M. Emery, Dairy Products Indicator, Filed June 3, 1940, No. 2,261,515 — Nov. 4, 1941.

2,261,515

UNITED STATES PATENT OFFICE 2,261,515

DAIRY PRODUCTS INDICATOR

William Morton Emery, Columbia, S. C.

Application June 3, 1940, Serial No. 338,616

1 Claim. (Cl. 116—133)

This invention aims to provide a simple device, adapted to be placed on the neck of a milk bottle, to indicate various dairy products which the purchaser may desire.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the drawing:

Fig. 1 shows in side elevation, a device of the class described, mounted on the neck of a milk bottle;

Fig. 2 is a vertical section on the line 2—2 of Fig. 1;

Fig. 3 is a top plan of the structure depicted in Figs. 1 and 2;

Fig. 4 is a plan showing the reverse surface of one of the disks.

In carrying out the invention, there is provided an inverted cup-shaped body 1, adapted to fit over the neck of a milk bottle 2. The body 1 has plenty of space for advertising matter, which it is improper to show in a patent drawing. Near its lower edge, the body 1 has an opening 3, whereby it may be hung up when not in use.

The top of the body 1 carries a combined pivot and clamping means, including a post 4, secured to the top of the body and disposed near the edge of the body, a clamping nut 5 being threaded on the post.

Any desired number of disks, such as the disks 60, 6, 7 and 8, are provided, and are supplied with oppositely-disposed openings 9 and 14, located close to the peripheries of the disks. The openings 9 and 14 receive the post 4, under varying conditions to be described hereinafter, and the disks may be held against swinging movement on the post, by tightening the clamping nut 5.

On their obverse surfaces, the disks 60, 6, 7 and 8 are supplied with central inscriptions 10. On their reverse surfaces, the disks 60, 6, 7 and 8 are supplied with central inscriptions 11. All of the inscriptions 10 and 11 are different. Near its edge, each of the disks 60, 6, 7 and 8 is provided with a circumferential inscription 12. The circumferential inscription 12 of each disk duplicates in meaning, the central inscription 11 on the same surface of that disk.

The range of use may be extended by taking off the clamping nut 5 and turning over any disk, for instance the disk 6 of Fig. 4, so that its inscription 11 on the reverse side is made visible, proper choice being made between the openings 9 and 14, as a means for mounting the disk on the post 4.

All of the disks 60, 6, 7 and 8 do not have to be mounted on the post 4, unless there is occasion for using all of them at once. The unused disks can be hung up by means of either of the openings 9 or 14, or be stowed in any other convenient manner. If but one kind of merchandise is required, the disk 8, for example, can be put on the post 4, above the cap 1, the opening 9 being used, and the nut 5 being tightened. If two kinds of merchandise are required, the disk 6 can be put on the post 4, in the outstanding position of Fig. 3, the opening 14 being used, because otherwise the inscription 10 would appear upside-down.

If three kinds of merchandise are required the disk 7 is used, the opening 9 receiving the post 4, and the disk 7 being swung out a little, to expose the circumferential inscription 12, since as the number of disks increases, the chance of showing the central inscription 10 decreases. If four kinds of merchandise are required, the disk 60 is used, the opening 14 receiving the post 4, and the disk 60 being swung out a little, to show its circumferential inscription 12 beyond the periphery of the disk 6, as the inscription 12 of the disk 7 appears beyond the periphery of the disk 8.

When the vendor carries off the empty bottle 2 upon which the body 1 is placed by the purchaser, the vendor can place the body on a full bottle which is being delivered.

The device is simple in operation but will be found thoroughly advantageous to consummate the objects hereinbefore set forth.

Having thus described the invention, what is claimed is:

Indicating mechanism for use in transactions wherein containers pass back and forth between purchaser and vendor, comprising a body shaped for retention on the upper end of a container, a pivot element on the body, adjacent to the periphery thereof, a plurality of disks each having a transverse inscription reading from left to right, certain of the disks being superposed, another of the disks being disposed outwardly of the superposed disks, with its inscription exposed parallel to the inscription on the uppermost of the superposed disks, said other disk having a first opening receiving the pivot element, the superposed disks having second openings receiving the pivot element, the superposed disks having first openings located 180 degrees from the second openings thereof, whereby any superposed disk may take the place of said other disk, said other disk having a second opening located 180 degrees remote from the first opening thereof, whereby said other disk may take the place of the uppermost of the superposed disks.

WILLIAM MORTON EMERY.